United States Patent [19]

Bateman

[11] 4,319,218
[45] Mar. 9, 1982

[54] NEGATIVE CLIMB AFTER TAKE-OFF WARNING SYSTEM WITH CONFIGURATION WARNING MEANS

[75] Inventor: Charles D. Bateman, Bellevue, Wash.

[73] Assignee: Sundstrand Corporation, Rockford, Ill.

[21] Appl. No.: 109,580

[22] Filed: Jan. 4, 1980

[51] Int. Cl.³ ..................... G01C 21/00; G08B 23/00
[52] U.S. Cl. ........................ 340/27 AT; 73/178 T; 244/180
[58] Field of Search .......... 340/27 R, 27 AT, 27 NA, 340/27 SS; 244/180, 181, 183; 73/178 R, 178 T, 179; 364/424, 427, 428, 433, 434; 343/7 TA, 5 LS, 108 R, 112 A, 112 CA

[56] References Cited

U.S. PATENT DOCUMENTS

| | | | |
|---|---|---|---|
| 3,715,718 | 2/1973 | Astengo | 340/27 R |
| 3,946,358 | 3/1976 | Bateman | 340/27 R |
| 3,947,810 | 3/1976 | Bateman et al. | 340/27 AT |
| 4,030,065 | 6/1977 | Bateman | 340/27 AT |
| 4,060,793 | 11/1977 | Bateman | 340/27 R |

FOREIGN PATENT DOCUMENTS 1567553  5/1980  United Kingdom.
1567554  5/1980  United Kingdom.

OTHER PUBLICATIONS

Sundstrand Data Control, Inc., "Mark II Ground Proximity Warning System", 1976.

Primary Examiner—James J. Groody
Attorney, Agent, or Firm—Ted E. Killingsworth; Michael B. McMurry; Harold A. Williamson

[57] ABSTRACT

During a take-off or missed approach phase of operation the aircraft's maximum barometric altitude is retained in a memory element and compared to the aircraft's current altitude, and if the aircraft's current barometric altitude should be below the maximum altitude by a predetermined amount based on the aircraft's radio altitude, a voice warning is generated indicating that the aircraft is descending. Landing gear and flaps are monitored by the system and if the gear or flaps are down, an additional voice warning is generated indicating that the gear or flaps are down.

29 Claims, 2 Drawing Figures

NEGATIVE CLIMB AFTER TAKE-OFF WARNING SYSTEM WITH CONFIGURATION WARNING MEANS

TECHNICAL FIELD

The invention relates to the field of aircraft ground proximity warning systems and, in particular, to systems that warn of aircraft descent after take-off or during a missed approach.

BACKGROUND OF THE INVENTION

In prior art ground proximity warning systems such as the systems disclosed in U.S. Pat. Nos. 3,946,358 and 3,947,810, warnings are generated during a take-off or a missed approach phase of operation if the aircraft should descend at a predetermined barometric rate or lose a predetermined amount of barometric altitude prior to reaching a predetermined altitude such as 700 feet. The object of the warning is to prevent the flight crew from flying the aircraft back into the terrain directly after take-off or during a missed approach maneuver. Such accidents have occurred during periods of reduced visibility when the flight crew is unable to determine from outside visual references that the aircraft is descending. Ground proximity warning systems in use today will typically generate a voice warning in this type of situation with the voice warning consisting of the words "whoop-whoop", "pull-up" or "don't sink". This type of voice warning is normally adequate to provide a pilot with sufficient warning that the aircraft is inadvertently descending after take-off although the warning "don't sink" is considered to be better than "pull-up" since it provides the pilot with more specific information as to the nature of the hazzard faced by the aircraft. However there are situations in which it may be highly desirable to provide the pilot with more specific information as to the aircraft's actual condition. For example, during a take-off phase of flight if an engine should fail the aircraft may not be able to climb and may actually lose altitude when it is in certain flight configurations. There are certain aircraft types that under certain conditions such as an engine out configured with the landing gear down or with landing flaps down are unable to gain altitude and in fact will tend to lose altitude. Under these circumstances a simple warning of "pull-up" or "don't sink" may not provide the pilot with any useful information since he may understand quite well that he is descending but what he may not realize is that the reason he is descending is that the aircraft is not in the proper configuration for an engine out condition. It should be noted that in addition to the landing gear and flaps, flight configuration of an aircraft could include a number of other elements such as leading edge slat extensions and trim considerations. There have been incidents where the flight crew upon losing an engine during take-off have not realized that the landing gear was in an extended condition due to the large amount of work in the cockpit connected with a return to the airport under emergency conditions.

Prior art negative climb after take-off warning systems that utilize an actual loss of barometric altitude after take-off to generate a warning such as disclosed in U.S. Pat. No. 3,947,810 use an integrator to integrate barometric descent rate to get the measure of altitude loss. The integration of a barometric rate signal can lead to errors based on integrator drift or the nature of the barometric signal used.

SUMMARY OF THE INVENTION

It is therefore an object of the invention to provide a negative climb warning system that provides a specific warning to the flight crew of aircraft configuration as well as a warning that the aircraft is descending after take-off.

It is another object of the invention to provide a negative climb warning system that will generate a warning to the pilot that the landing gear is down if the aircraft is descending after take-off with the gear down and will also generate a warning to the pilot that the flaps are down if the aircraft is descending after take-off with the flaps down.

It is a further object of the invention to provide a negative climb warning system with logic elements responsive to the landing gear condition and the flap condition in order to generate a "gear" voice warning or a "flaps" voice warning in addition to a "don't sink" voice warning when the aircraft is descending in a take-off or missed approach phase of operation.

It is an additional object of the invention to provide a ground proximity warning system for aircraft which will generate a warning when the aircraft descends during take-off responding to signals representing the configuration of the aircraft, signals indicating the phase of flight such as take-off, missed approach or landing and a signal indicating that the aircraft is descending wherein a first warning signal is generated when the aircraft is descending and a second type of warning signal is generated when the aircraft is descending in a predetermined configuration.

Still another object of the invention is to provide a negative climb warning system that responds to signals representing the barometric altitude of the aircraft, signals representing the aircraft configuration, and signals representing the aircraft's phase of flight having an electronic memory circuit that stores in response to the operation of a first logic circuit the maximum barometric altitude that the aircraft has achieved during the take-off phase of operation and a second electronic logic circuit responsive to the first logic circuit for generating a warning signal when the current aircraft barometric altitude is less than the barometric altitude stored in the memory circuit and a circuit for generating a voice warning indicating that the aircraft is descending.

In order to provide the flight crew with more specific information when the aircraft is descending during a take-off phase of operation, the warning system is responsive to the condition of the landing gear and the flaps to generate additional voice warnings indicating that either the landing gear is down or the flaps are down in combination with a voice warning indicating that the aircraft is descending.

The system for determining whether or not the aircraft is descending during the take-off or missed approach phase of operation includes a memory element that responds to a signal indicating the aircraft's current barometric altitude. As the aircraft continues to climb, the altitude stored in the memory element is continuously updated thereby providing a reference for the aircraft's maximum altitude. However if the aircraft should begin to descend, logic elements are provided in the warning system to compare the aircraft's current barometric altitude with the barometric altitude stored in the memory element and a warning is generated if the difference between the current altitude and the maximum altitude exceed a predetermined amount. The amount of altitude required to generate a warning will vary as a function of radio altitude which is also used as an input to the system. The amount of difference between the maximum barometric altitude and the current barometric altitude before a warning is given will increase as a function of increasing radio altitude such that the aircraft is allowed to descend more when it is higher above the ground.

DETAILED DESCRIPTION OF THE INVENTION

Figure 1:
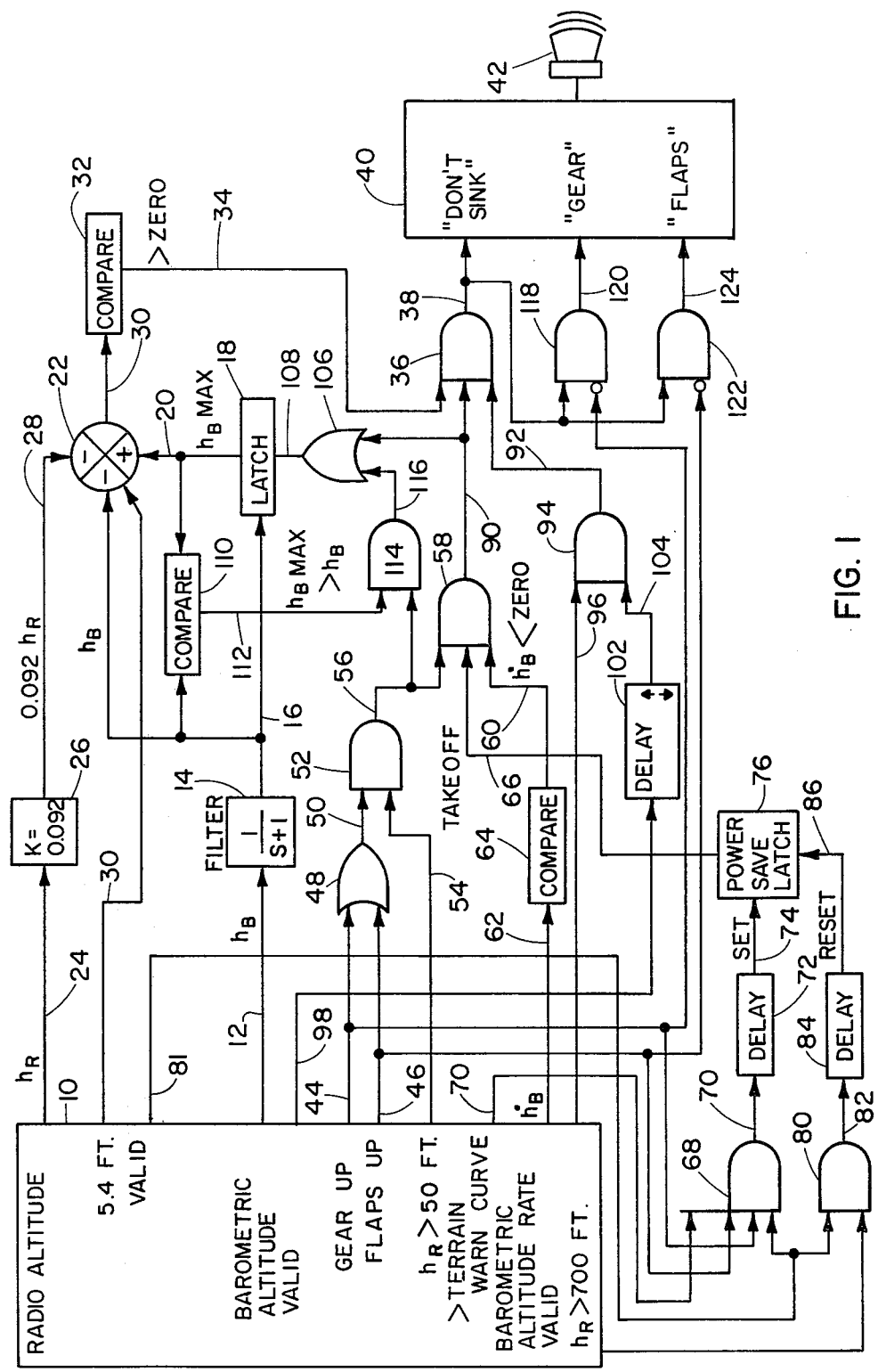
FIG. 1 is a functional block diagram for implementing the warning system.

In FIG. 1 is illustrated in block diagram form the logic of the preferred embodiment of the invention. A source of signals or data source for the negative climb after take-off warning system is shown in block 10 of FIG. 1. The signals used by the warning system as described include radio altitude, barometric altitude, barometric altitude rate and signals indicating the position of the aircraft's landing gear and flaps along with various validity signals. Depending upon the type of aircraft in which the warning system is installed, the signals shown in block 10 can be obtained from individual instruments such as a radio altimeter, a barometric altimeter or discreet circuit elements indicating the position of the gear and flaps or in the case of some of the newer commercial aircraft some or all of this information is available on a digital data bus.

In order to determine whether or not the aircraft is losing barometric altitude, the barometric altitude signal $h_B$ is transmitted from the data source 10 on line 12 to a filter 14. The filter 14 with preferably a time constant on the order of two to three seconds filters out the short-term variations in the barometric altitude signal. The filtered barometric altitude signal is then transmitted on line 16 to a latch circuit or electronic memory circuit 18 which serves to store the value of the aircraft's barometric altitude. The latch circuit 18 shown in FIG. 1 can be an analog latch circuit serving to hold a voltage representing aircraft altitude or could be an electronic memory or register serving to hold a digital representation of aircraft altitude. The value of the barometric altitude stored in the memory element 18 $h_{Bmax}$ represents the maximum barometric altitude that the aircraft has achieved during the take-off phase of operation and $h_{Bmax}$ is transmitted over line 20 to a positive terminal of the summing element 22. The value of the current barometric altitude $h_B$ on line 16 in then applied to a negative terminal of summing element 22. Radio altitude information $h_R$ which is usually derived from a radio altimeter and represents the aircraft altitude above ground is transmitted from the data source 10 over line 24 to a multiplier circuit 26. Multiplier 26 multiplies or scales the value of the radio altitude signal $h_R$ by a factor of 0.092. The scaled value or the radio altitude signal is then applied over line 28 to a negative terminal of the summing circuit 22. Summing element 22 additionally receives at a negative terminal the barometric altitude signal $h_B$ by means of line 16. Also applied to a negative summing terminal of summing circuit 22 is a biasing quantity equal to 5.4 feet delivered over line 30 from the data souce 10. The output of summing element 22 is then applied over line 30 to a comparator or logic circuit 32 which generates a positive output on line 34 if the combination of signals on lines 28, 16, 20 and 30 is greater than zero. A positive logic output on line 34 indicates that the aircraft has descended a predetermined amount below the maximum barometric altitude $h_{Bmax}$ achieved during the take-off or missed approach phase of operation. The predetermined amount of altitude loss that will result in a positive value on line 34 is dependent on radio altitude such that the greater the radio altitude, indicating the altitude of the aircraft above ground, the greater the permitted descent below the maximum barometric altitude achieved will be before a warning is generated.

The logic signal on line 34 is then applied to a logic element or AND gate 36 which in turn is transmitted on a line 38 to a voice warning generator 40. Examples of similar digital voice warning generators used in ground proximity warning systems are provided in U.S. Pat. Nos. 3,925,751, 4,030,065 and 4,060,793. In the preferred embodiment of the invention the voice warning generator 40 will generate the words "don't sink" through a cockpit speaker 42 thereby providing the flight crew with the information that the aircraft is descending.

Figure 2:
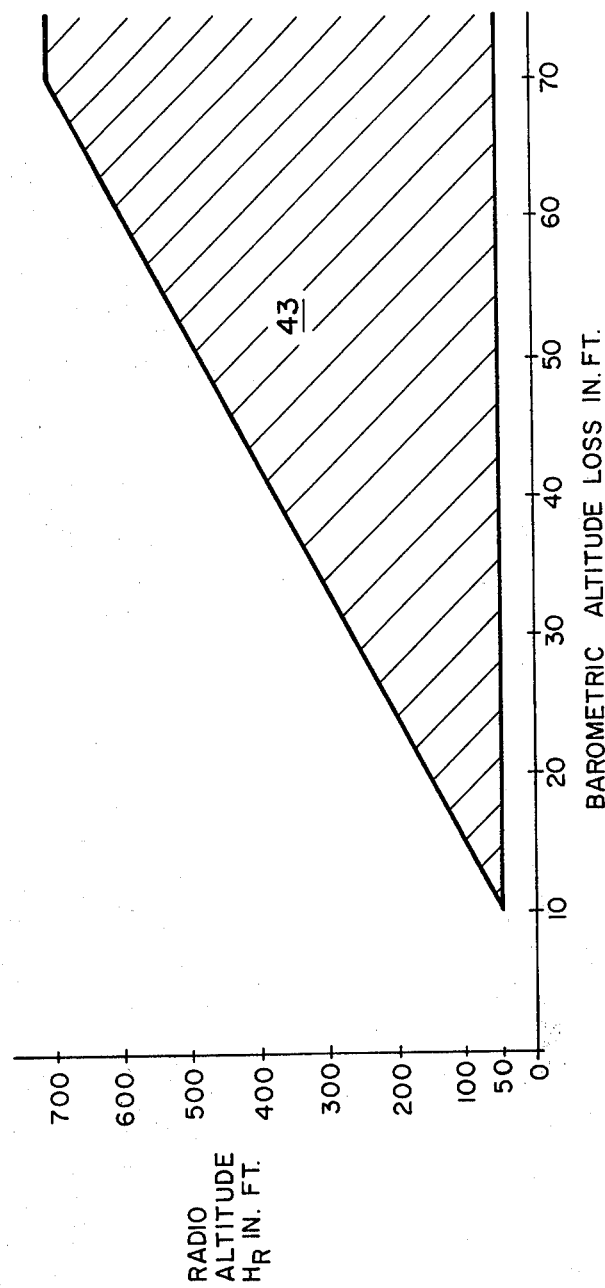
FIG. 2 is a graph illustrating the relationship between radio altitude and the amount of altitude the aircraft must descend before a warning is generated.

In FIG. 2 of the drawings a graphical representation of the relationship between radio altitude and loss of barometric altitude to generate a descent warning is provided. The verticle axis represents radio altitude in feet and the horizontal axis represents loss of barometric altitude in feet with the combinations of radio altitude and barometric altitude loss resulting in a negative climb after take-off warning indicated by the cross-hatched area 43. As illustrated by the graph of FIG. 2, larger descents below the maximum barometric altitude will be permitted for greater radio altitude without a descent warning being generated and with no warnings being generated below 50 feet of radio altitude.

As indicated in FIG. 1, since the warning is only generated in the preferred embodiment when the aircraft is in a take-off or missed approached phase of operation and when the aircraft is descending with respect to barometric altitude, logic is provided to ensure that warnings are only given under those circumstances. To that end, the data source 10 provides the signal on line 44 indicating that the aircraft's landing gear is in an up position and a signal on line 46 indicating that the aircraft's flaps are up. These signals are applied to an OR logic gate 48 which in turn applies the resulting logic signal to a logic AND gate 52. The other input to the logic AND gate 52 is a logic signal on line 54 from the data source 10 indicating when the aircraft is 50 feet or more above the ground. This signal may be obtained from a radio altimeter. If either or both of the landing gear and flaps are up and if the aircraft is above 50 feet, there will be a logic output from logic gate 52 on line 56 which is applied to a logic AND gate 58. Also applied to logic gate 58 is a signal over line 60 that indicates that the aircraft is descending with respect to barometric altitude. Utilizing a barometric altitude rate signal $h_{\dot{B}}$ from the data source 10 on line 62 a comparator circuit 64 will generate a logic signal on line 60 indicating that the aircraft is descending with respect to barometric altitude. The third input to logic gate 58 on line 66 indicates whether or not the aircraft is in a take-off of missed approach phase of operation.

To indicate that the aircraft is in a take-off or missed approach phase of operation the signals on lines 44 and 46 indicating that the landing gear and flaps are in an up position are applied to a logic gate 68. Also applied to logic gate 68 is a signal on line 70 indicating that the aircraft is below a terrain warning curve. The terrain warning curve represents another mode of operation of a ground proximity warning system that is described in detail in U.S. Pat. Nos. 3,936,796 and 4,030,065. When the aircraft is below a terrain warning curve with both the landing gear and the flaps up, it is assumed that the aircraft is in a take-off or a missed approached phase of operation in which case a logic signal is transmitted on line 70 through a delay circuit 72 on line 74 to a latch 76. A positive logic signal on line 74 will serve to set latch 76 thereby transmitting a logic signal on line 66 to logic gate 58. When the aircraft exceeds an altitude of 700 feet above ground, thereby indicating that it is no longer in a take-off or missed approach phase of operation, a signal is transmitted from the data source 10 on line 78 to a logic AND gate 80. A logic signal transmitted from gate 80 via line 82 through a delay circuit 84 and line 86 has the effect of resetting the latch 76. When latch 76 has been reset, the aircraft is no longer in a take-off phase of operation and the logic signal on line 66 is turned off. It should be noted at this point that an additional validity input is applied over line 81 to logic gate 68 and 80 to ensure that the signals are valid.

The logic described in the paragraph above will also serve to indicate when the aircraft is in a missed approach phase of operation. Normally when the missed approach maneuver is initiated, the aircraft is below the terrain warn curve 70 as well as under 700 feet so that when the gear and flaps are cycled up, the latch 76 will be set and there will be a logic output on line 90.

As a result when the aircraft is configured with either its gear or flaps in an up position, and is 50 feet above the terrain and is in a take-off phase of operation while descending with respect to barometric altitude, a logic signal will be transmitted from gate 58 on line 90 enabling logic gate 36 so that the voice warning can be generated by the voice generator 40.

An additional input to logic gate 36 is received over line 92 from a logic AND gate 94. A first input to logic gate 94 over line 96 represents a logic signal from the data source 10 indicating that the barometric altitude rate data is valid. A second logic signal from the data source 10 is transmitted over line 98 through a delay circuit 100 and line 102 to gate 94 and indicates that the barometric altitude data is valid.

In order to ensure that the barometric altitude data contained in memory element 18 represents the aircraft's maximum barometric altitude achieved during the take-off phase of operation, a logic signal is transmitted through an OR logic gate 106 to the memory element 18. The signal transmitted to memory element 18 over line 108 from line 90 indicates that the aircraft is in a take-off phase of operation and is descending and that the current value of barometric altitude should be retained. The value of the barometric altitude in memory element 18 is also retained when the value of barometric altitude in the memory element 18 is greater than the current barometric altitude, the aircraft is above 50 feet and either the gear is up or the flaps are up. This information is obtained from a comparator circuit 110 which generates a positive logic signal on line 112 when the value of $h_{Bmax}$ is greater than the aircraft's current barometric altitude $h_B$. This logic signal is then applied to a logic AND gate 114. Also applied to logic gate 114 is the logic signal from line 56. As a result when the value of the maximum barometric altitude exceeds the current barometric altitude, and when the aircraft is above 50 feet above the ground with gear or flaps up a logic signal will be transmitted on line 116 through logic OR gate 106 to the latch or memory element 18 thereby serving to retain the existing value in that memory element.

In the preferred embodiment of the invention it may be considered desirable under certain circumstances to give the flight crew additional information with respect to the aircraft's configuration as well as the basic negative climb after take-off warning which in the preferred embodiment of the invention is a "don't sink" voice warning. For example if the landing gear is down it would be desirable to give the flight crew an indication that the aircraft is sinking and the gear is still down. This is accomplished in the preferred embodiment of the invention as illustrated in FIG. 1 by means of a logic element 118 that responds to the basic negative climb warning on line 38 and the gear up signal on line 44. When the landing gear is up the logic signal on line 44 will be transmitted through an inverting input of AND gate 18 thus enabling the gate causing a logic signal on line 120 to activate a "gear" voice warning on the voice warning generator 40. The warning generated through speaker 42 to the flight crew will be "don't sink, gear".

In the event that the aircraft is in a negative climb after take-off with the flaps down, a logic AND gate 122 responding to the basic warning signal on line 38 and the flaps up signal on line 46 applied through an inverting input to AND gate 122 will transmit a logic signal to the voice generator over line 124 causing the generation of the warning signal "don't sink, flaps". As a result, the flight crew will have more specific information as to the aircraft's condition and can be particularly helpful in those engine out cases where, due to a very high work load in the cockpit, the flight crew may not realize that either the landing gear is down or the flaps are down.

The preferred embodiment of the invention has been described in terms of a logic diagram using analog symbols and terminology. However, it should be understood that the invention can be implemented in digital circuitry or a general purpose digital computer wherein the various symbols contained within FIG. 1 would represent logical operations to be performed in the digital system. In addition, the various altitudes and descent rates described herein are provided in order to illustrate the preferred embodiment of the invention and are not intended to limit the scope of the disclosure or the invention claimed. Similarly, although the warnings described in the preferred embodiment make reference to specific terms used in the voice generator such as "don't sink" or "gear" or "flaps", it is not intended that the invention as disclosed or claimed be limited to those specific terms including the designation of the aircraft configuration that is called to the flight crew's attention.

I claim:

1. A ground proximity warning system for use in an aircraft having a plurality of flight configurations for generating a warning of aircraft descent during a take-off phase of flight, comprising:

a source of signals representing the flight configuration of the aircraft;

logic means, responsive to said configuration signals, for generating a phase of flight signal indicating that the aircraft is in a take-off phase of flight;

means for generating a signal indicating that the aircraft is descending;

means, responsive to said phase of flight signal and said descent signal, for generating a first warning signal when the aircraft is descending during the take-off phase of flight; and means, responsive to said configuration signals and said first warning signal, for generating a second warning signal when the aircraft is in a first predetermined configuration when the aircraft is descending during the take-off phase of flight.

2. The warning system of claim 1 additionally including means, responsive to said configuration signals and said first warning signal, for generating a third warning signal when the aircraft is in a second predetermined configuration.

3. The warning system of claim 2 wherein said first predetermined configuration represents a landing gear down condition and said second predetermined configuration represents a flaps down condition.

4. The warning system of claim 1 wherein said first predetermined configuration represents a landing gear down condition.

5. The warning system of claim 1 wherein said first predetermined configuration represents a landing gear down condition and additionally including a voice warning generator responsive to said first and said second warning signals for generating a first voice warning indicating that the aircraft is descending and for generating in addition to said first voice warning a second voice warning in response to said second warning signal indicating that the aircraft landing gear is down.

6. The warning system of claim 2 additionally including a voice generator responsive to said first, second and third warning signals for generating a first voice warning in response to said first warning signal indicating that the aircraft is descending, generating a second voice warning in response to said second warning signal indicating that the aircraft is descending with the landing gear down and for generating a third voice warning in response to the third warning signal indicating that the aircraft is descending with the flaps down.

7. The warning system of claim 1 additionally including a source of a signal representing the aircraft barometric altitude and wherein said descent signal generating means includes;

means responsive to the barometric altitude signal and said phase of flight signal for storing a value representing the maximum barometric altitude achieved by the aircraft during the take-off phase of flight;

means operatively connected to said storing means and said barometric altitude signal, for comparing said value representing the maximum barometric altitude with the aircrafts current barometric altitude; and means operatively connected to said comparing means for generating said descent signal when the aircraft's current barometric altitude is below said maximum barometric altitude by a predetermined amount.

8. The warning system of claim 7 additionally including a source of a radio altitude signal; and means operatively connected to said comparing means and responsive to said radio altitude signal for varying as a function of radio altitude said predetermined amount of difference between said maximum barometric altitude and the current barometric altitude to generate said first warning signal.

9. The warning system of claims 1, 2, 3, 4, 5, 6, 7 or 8 additionally including a source of signals representing barometric altitude rate and wherein said descent signal generating means is responsive to said barometric altitude rate signals such that said first warning signal is only generated when the aircraft is descending with respect to barometric altitude.

10. An aircraft ground proximity warning system, for use in an aircraft having a plurality of flight configurations, for generating a warning of aircraft descent during the take-off phase of flight, comprising:

a source of a signal representing the barometric altitude of the aircraft;

a source of signals representing the flight configuration of the aircraft;

a source of a signal representing the radio altitude of the aircraft;

means, responsive to said barometric altitude signal, said radio altitude signal and said configuration signals, for generating a signal indicating that the aircraft is in a take-off phase of flight;

means, responsive to said barometric altitude signal, for generating a signal indicating that the aircraft is descending with respect to barometric altitude;

means, responsive to said phase of flight signal and said descent signal for generating a descent warning signal when the aircraft is descending with respect to barometric altitude during the take-off phase of flight;

means, responsive to said configuration signals and said descent warning signal, for generating a configuration warning signal when the aircraft is in a predetermined configuration when the aircraft is descending during the take-off phase of flight; and a voice generator responsive to said descent warning signal and said configuration warning signal for generating a voice warning indicating that the aircraft is descending in said predetermined configuration.

11. The warning system of claim 10 wherein said configuration signals represents a plurality of aircraft configurations including landing gear and flap positions, and wherein said voice generator generates a voice warning indicating the specific aircraft configuration.

12. The warning system of claim 11 wherein said descent signal means includes means for measuring a loss of barometric altitude and means for generating said descent signal when said loss in barometric altitude exceeds a predetermined amount.

13. The warning system of claim 12 wherein said voice generator includes means for generating the words "don't sink, gear" in response to said descent warning signal and said configuration warning signal indicating that the aircraft landing gear is down.

14. The warning system of claim 13 wherein said voice generator includes means for generating the voice warning "don't sink flaps" in reponse to the descent warning signal and said configuration signal indicating that the aircraft flaps are down.

15. An aircraft ground proximity warning instrument for generating a warning signal of aircraft descent of a predetermined amount during the take-off phase of flight comprising:
- a source of a signal representing the barometric altitude of the aircraft;
- a source of signals representing the aircraft flight configuration;
- a source of a signal representing the aircraft's phase of flight indicating whether or not the aircraft is in a take-off phase of flight;
- an electronic memory circuit;
- first logic means, responsive to said barometric altitude signal, said configuration signal and said phase of flight signal and operatively connected to said electronic memory circuit, for storing a value representing the maximum barometric altitude that the aircraft has achieved during the take-off phase of flight in said electronic memory circuit;
- second logic means, responsive to said first logic means and said barometric altitude signal, for generating a warning signal when the aircraft barometric altitude is less than the barometric altitude stored in said electronic memory circuit by a predetermined amount during the take-off phase of flight; and
- a voice generator, responsive to said warning signal for generating a voice warning.

16. The warning system of claim 15 additionally including:
- a source of a signal representing the rate of barometric altitude change of the aircraft; and
- wherein said first logic means additionally includes latching means responsive to said barometric altitude rate signal for preventing a change in the value of altitude stored in said electronic memory circuit when the aircraft is descending with respect to barometric altitude.

17. The warning system of claim 16 additionally including a third logic means, responsive to said barometric rate signal and said phase of flight signal and operatively connected to said latching means, for causing said latching means to prevent a change in the value of altitude stored in said electronic memory circuit when the aircraft is descending with respect to barometric altitude and the aircraft is in a take-off phase of flight.

18. The warning system of claim 17 wherein said third logic means is additionally responsive to said configuration signals thereby being effective to cause said latching means to prevent a change in the value of the altitude stored in said electronic memory circuit when the aircraft is descending with respect to barometric altitude and when the aircraft is in a take-off phase of flight and when the aircraft is in a predetermined configuration.

19. The warning system of claim 17 additionally including a source of an altitude logic signal indicating that the aircraft is above a predetermined altitude above the ground; and
- wherein said third logic means is additionally responsive to said altitude logic signal thereby being effective to cause said latching means to prevent a change in the altitude value stored in said electronic memory circuit when the aircraft is descending with respect to barometric altitude and when the aircraft is in a take-off phase of flight and when the aircraft is in a predetermined configuration and when the aircraft is above a predetermined altitude above the ground.

20. The warning system of claim 15 additionally including:
- means operatively connected to said electronic memory circuit and responsive to said barometric altitude signal, for comparing the altitude value stored in said electronic memory circuit with the said barometric altitude signal; and
- wherein said first logic means additionally includes latching means operatively connected to said comparing means, for preventing a change in the value of altitude in said electronic memory circuit when the value of altitude stored in said electronic memory circuit is greater than the aircraft's barometric altitude.

21. The warning system of claim 20 additionally including a third logic means operatively connected to said comparing means and said latching means and responsive to said configuration signals, for causing said latching means to prevent a change in the value of altitude stored in said electronic memory circuit when the altitude stored in said electronic memory circuit is greater than the aircraft's barometric altitude and the aircraft is in a predetermined configuration.

22. The warning system of claim 21 additionally including a source of an altitude logic signal indicating that the aircraft is above a predetermined altitude above ground; and
- wherein said third logic means is additionally responsive to said altitude logic signal thereby being effective to cause said latching means to prevent a change in the altitude value in said electronic memory circuit when the altitude in said electronic memory circuit is greater than the aircraft's barometric altitude and when the aircraft is in said predetermined configuration and when the aircraft is above said predetermined altitude above ground.

23. A warning system of claim 15 wherein said second logic means includes means for summing said barometric altitude signal with the altitude value stored in said electronic memory circuit and comparing means operatively connected to said summing means for generating a warning logic signal when said maximum barometric altitude exceeds the aircraft barometric altitude.

24. The warning system of claim 22 additionally including a source of a signal representing the rate of barometric altitude change of the aircraft; and
- wherein said second logic means additionally includes a third logic means responsive to said warning logic signal and responsive to said barometric altitude rate signal for enabling said warning signal when said warning logic signal is present and the aircraft is descending with respect to barometric altitude rate.

25. The warning system of claim 24 wherein said third logic means is additionally responsive to said phase of flight signal, for enabling said second logic means to generate said warning signal when the aircraft is in a take-off phase of flight and when the aircraft is descending with respect to barometric altitude rate.

26. The warning system of claim 25 wherein said third logic means is additionally responsive to said configuration signal for enabling said second logic means to generate said warning signal when the aircraft is in a predetermined configuration.

27. The warning system of claim 26 additionally including a source of an altitude logic signal indicating that the aircraft is above a predetermined altitude above the ground; and wherein said third logic means is additionally responsive to said altitude logic signal for enabling said second logic means to generate said warning signal when the aircraft is above said predetermined altitude above the ground.

28. The warning system of claim 23 additionally including a source of a signal representing the aircraft radio altitude; and wherein said summing means additionally receives said radio altitude signal and said comparing means generates said warning logic signal when the maximum barometric altitude exceeds the sum of the aircraft's barometric altitude and a function of the aircraft's radio altitude.

29. The warning system of claims 15, 16, 17, 18, 19, 20, 21, 22, 23, 24, 25, 26 or 27 additionally including configuration logic means responsive to said configuration signals and said warning signal and operatively connected to said voice generator for causing said voice generator to generate a voice warning indicating aircraft configuration when the aircraft has descended by a predetermined amount during the take-off phase of flight.

* * * * *